United States Patent [19]

Lawrence et al.

[11] Patent Number: 5,312,217
[45] Date of Patent: May 17, 1994

[54] RESOLVED MOTION VELOCITY CONTROL

[75] Inventors: Peter D. Lawrence, Vancouver, Canada; Réal N. Frenette, Sagamihara, Japan; Danley C. K. Chan, Vancouver, Canada

[73] Assignee: The University of British Columbia, Vancouver, Canada

[21] Appl. No.: 898,338

[22] Filed: Jun. 15, 1992

[51] Int. Cl.$^5$ .............................. B25J 13/02
[52] U.S. Cl. ............................ 414/4; 91/361; 91/364; 74/471 XY
[58] Field of Search ............... 414/4; 74/471 XY; 91/361, 364

[56] References Cited

U.S. PATENT DOCUMENTS

| | | | |
|---|---|---|---|
| 4,763,560 | 8/1988 | Sasaki | 91/361 X |
| 5,062,755 | 11/1991 | Lawrence | |
| 5,142,931 | 9/1992 | Menahem | 74/471 XY |

Primary Examiner—David A. Bucci
Assistant Examiner—Donald W. Underwood
Attorney, Agent, or Firm—C. A. Rowley

[57] ABSTRACT

A method and apparatus for controlling the movement of an end point of an articulated arm in the x, y and z directions using a manually operated resolved motion control by controlling the component of velocity of the end point in each of the x, y and z directions to change by the same amount for a given change in the component of displacement of the manual controller in the respective x, y and z directions provided the total displacement in the selected x, y or z direction is less than a preselected displacement in the respective x, y or z direction and the end point is within a preselected work space. The velocity of the end point in any one of the x, y and z directions when the total displacement of the manual controller in the respective x, y or z direction is greater than the preselected displacement changes at a ratio of end point speed to change in the component of controller displacement that is independent of the ratio of controller displacement to end point speed in at least one of the other of the x, y or z directions.

16 Claims, 3 Drawing Sheets

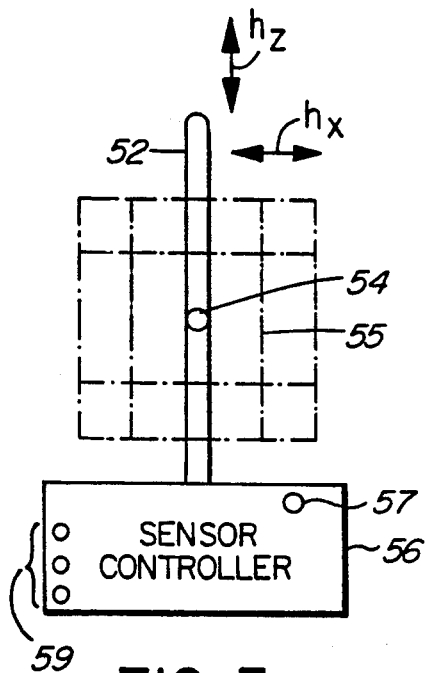
FIG. 3
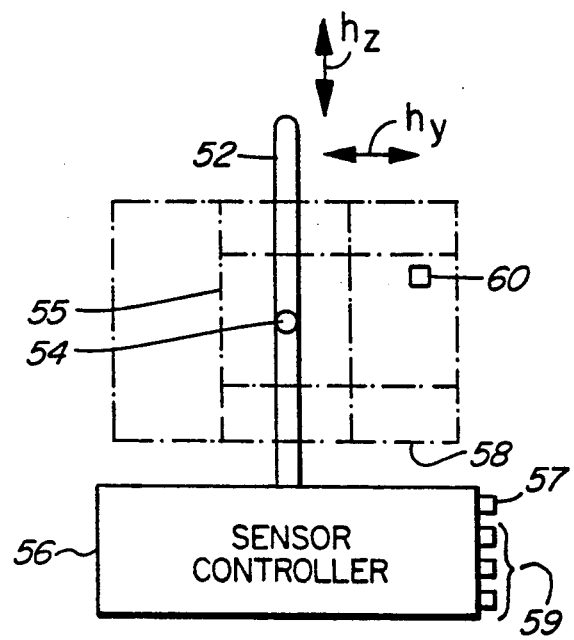
FIG. 4
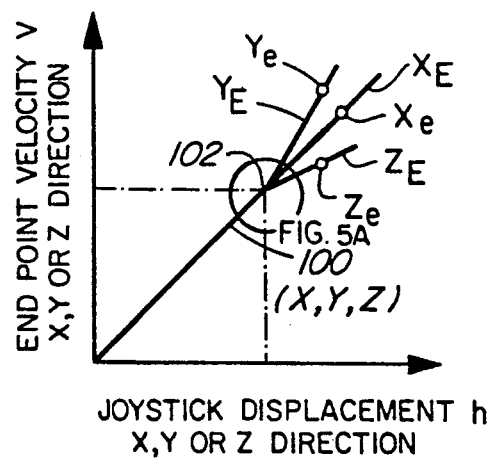
FIG. 5
FIG. 5A

RESOLVED MOTION VELOCITY CONTROL

FIELD OF THE INVENTION

The present invention relates to a method and apparatus for controlling the velocity of an end point in an articulated arm. More particularly the present invention relates to a method and apparatus for insuring movement of the end point in the x, y and z directions and at the same speed corresponding to the same amount of movement of the manual controller in the respective x, y and z directions up to a preselected displacement of the manual controller in the x, y and z directions and generally at a higher speed for displacements of the hand controller beyond the preselected displacement.

BACKGROUND OF THE PRESENT INVENTION

The concept of resolved motion for controlling an articulated arm is known and has been practiced for some time.

U.S. Pat. No. 5,062,755 issued Nov. 5, 1991 to Lawrence et al discloses a preferred system of resolved motion velocity control wherein the velocity in any given direction (regardless of the position of the end point, i.e., radius of the end point) is dependent on the amount of displacement of the manual controller in that direction so that the movement of the manual controller in the direction of intended movement of the end point results in movement of the end point in that direction. The disclosure of this patent is incorporated herein by reference.

It will be apparent that controlling the movement of the end point in this manner is extremely helpful and facilitates accurate movement of the end point under the control of the operator. It will also be apparent that at the very extremities of arm movement, i.e. near a singularity, it may be impossible for the end point to move along a desired path at the desired speed, however for practical purposes throughout substantially the whole workspace of the arm, i.e. positions of the end point within a predefined workspace (that normally will include substantially the whole workspace), controls may be implemented so that movement of the controller (joystick) in a given direction results in movement of the end point in that given direction at a velocity corresponding to the amount of displacement of the controller or joystick.

It will be apparent that to ensure movement of the end point in the direction of movement of the joystick requires that the same displacement of the joystick or hand controller in any one of the x, y or z directions generates the same speed of the end point in the corresponding x, y or z direction. Thus the maximum speed of the end point is then set by the maximum speed achievable in the work space by the slowest component of movement of the end point in the work space in which the control is to so operate. Reducing the size of the work space in which the above relationship applies so that the end point does not approach singularities or other areas where velocity is severely restricted (e.g. when the endpoint approaches the z axis the velocity of the end point in the y direction approaches zero) results in the maximum cartesian velocity in slowest direction being increased.

In some cases it may be also desirable to operate in one or more directions at a speed such that it would be impossible to maintain the direction and speed relationship between joystick or hand controller movement and end point movement. For example, it may be desirable to swing the arm at a relatively fast rate without movement of the joystick precisely corresponding to the direction (and speed) of movement of end point, i.e. permitting maximum speed of the end point to be based on the physical capability of the arm and its actuators for the particular location and desired direction of movement where movements of the end point need not be precisely controlled, but prior to the present invention no such means has been available.

BRIEF DESCRIPTION OF THE PRESENT INVENTION

It is an object of the present invention to provide a control system imposing coordinated movement between the controller and end point of an articulated arm at velocities in the x, y or z directions below a preselected maximum and permitting higher joystick controlled speed of the end point when precise directionality of movement is not required.

Broadly the present invention relates to a method and apparatus for controlling the movement of an end point of an articulated arm in x, y and z directions using a resolved motion control means having a manual controller by imposing a predetermined first ratio of end point velocity in the x, y and z direction to joystick displacement component in the corresponding x, y or z direction to all said components of endpoint velocity provided total movement of said controller does not exceed a preselected displacement in any one of said x, y and z directions so that said end point moves in a direction corresponding to the direction of movement of said manual controller and when said end point is within a preselected work space, changing said ratio of end point velocity to manual controller displacement in at least one of said x, y or z directions for a given component of displacement of said controller when said manual controller is moved beyond said preselected displacement of said manual controller in said at least one direction to a second ratio different from said first ratio.

Preferably said at least one direction will be said y direction and said second ratio will be higher than said first ratio.

Preferably said second ratio will be higher than said first ratio.

Preferably said second ratio will be a variable ratio that changes with increased displacement of said manual controller beyond said preselected displacement.

BRIEF DESCRIPTION OF THE DRAWINGS

Further features, objects and advantages will be evident from the following detailed description of the preferred embodiments of the present invention taken in conjunction with the accompanying drawings in which:

FIG. 3 is a section along the line 3—3 of the mapping of FIG. 2.

FIG. 4 is a section along the line 4—4 of FIG. 2.

FIG. 5 is a plot of end point velocity in the x, y and z directions versus joystick displacement in the x, y and z directions.

FIG. 5A is an enlargement within the circle 5A of FIG. 5.

DESCRIPTION OF THE PREFERRED EMBODIMENTS

Figure 1:
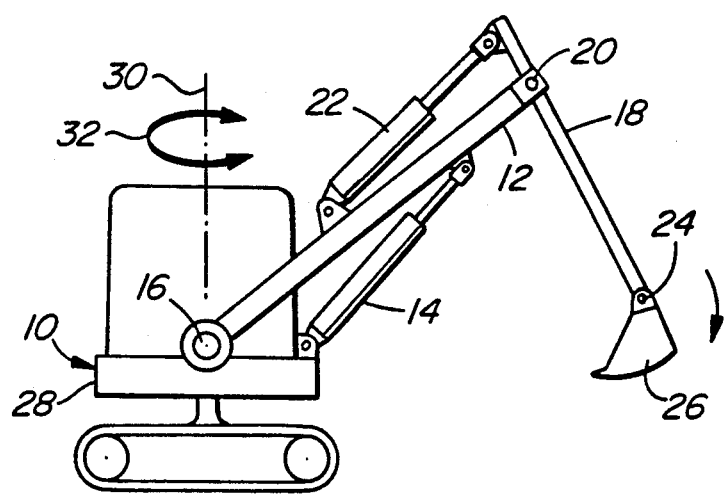
FIG. 1 shows a typical articulated arm system in which the present invention may be used.

As shown in FIG. 1 the articulated arm 10 is in the form of an excavator or the like having a boom 12 which is moved by a hydraulic cylinder 14 for movement about an axis 16. The stick 18 is pivotally mounted at the free end of the boom 12 as indicated at 20 and is moved relative to the boom 12 about the pivot 20 by a hydraulic cylinder 22. At the free end of the stick 18 is a pivot 24 which for the purposes of this disclosure will be defined as the end point of the articulated arm and on which in the illustrated embodiment is pivoted a bucket 26 which may be moved about the axis 24 for example by a suitable hydraulic piston (not shown).

The platform 28 upon which the axis 16 of the boom is mounted is rotatable about a vertical axis 30 (e.g. by a hydraulic motor) schematically indicated by the two headed arrow 32.

The end point 24 may be moved in the x, y and z directions by relative movements of the boom 12, stick 18 and base 18 by pivotal movement on the axis 16, 20 and 30. For the purposes of this description the x direction will always be in a direction away from the z axis 30, i.e. radially from the axis 30 (as opposed to cartesian coordinates based on the world). The y component is defined as the instantaneous component of movement of the end point provided by pivoting about the axis 30 and the z component is movement parallel to the axis 30 which normally will be substantially vertical.

Full extension of the arm in any direction or retraction to x=0 are examples of singularities. As the end point approaches a singularity major movements of the platform, stick and/or boom are sometimes required for a small increment of movement of the end point 24. As these singularities are approached, control of the movement of the end point in accordance with displacement of the hand controller (as will be described in more detail hereinbelow) becomes more difficult. Also as the singularities are approached the maximum end point velocities in at least some directions e.g. toward the singularity are significantly reduced. For example, when the arm is fully extended in the x direction the velocity of the end point in the x direction approaches zero and as above described when the end point approaches the z axis the velocity in the y direction must approach zero. It is therefore preferred to define a work space wherein movement of the end point corresponds to the movement of the manipulator or joystick (as will be described below) to be smaller than the total area in which the arm is able to move the end point 24 that is, to an area that does not closely approach these singularities and wherein movement of the end point may be reasonably quick and still be coordinated with movement of the hand controller or joystick (i.e. the region where movement of the joystick in a given direction results in a corresponding movement of the end point in that direction and at a velocity determined by the total amount of displacement of the joystick).

It will also be apparent that to coordinate the end point movement in the x, y and z directions so that movement of the joystick results in a corresponding movement of the end point as above described in some cases applies severe limits to the maximum operating speed obtainable, i.e. it will be apparent that actual limiting velocity, for example in the y direction is determined by the rate at which the platform 28 can pivot around the vertical axis 30 (z axis) and the distance of the end point 24 from the axis 30, whereas maximum velocity in the x direction is dependent on movements and lengths of the boom 12 and stick 18 as is movement in the z direction. Also as above indicated velocity in the x or z direction as the end point approaches singularities may necessitate further limiting of the speed.

Figure 2:
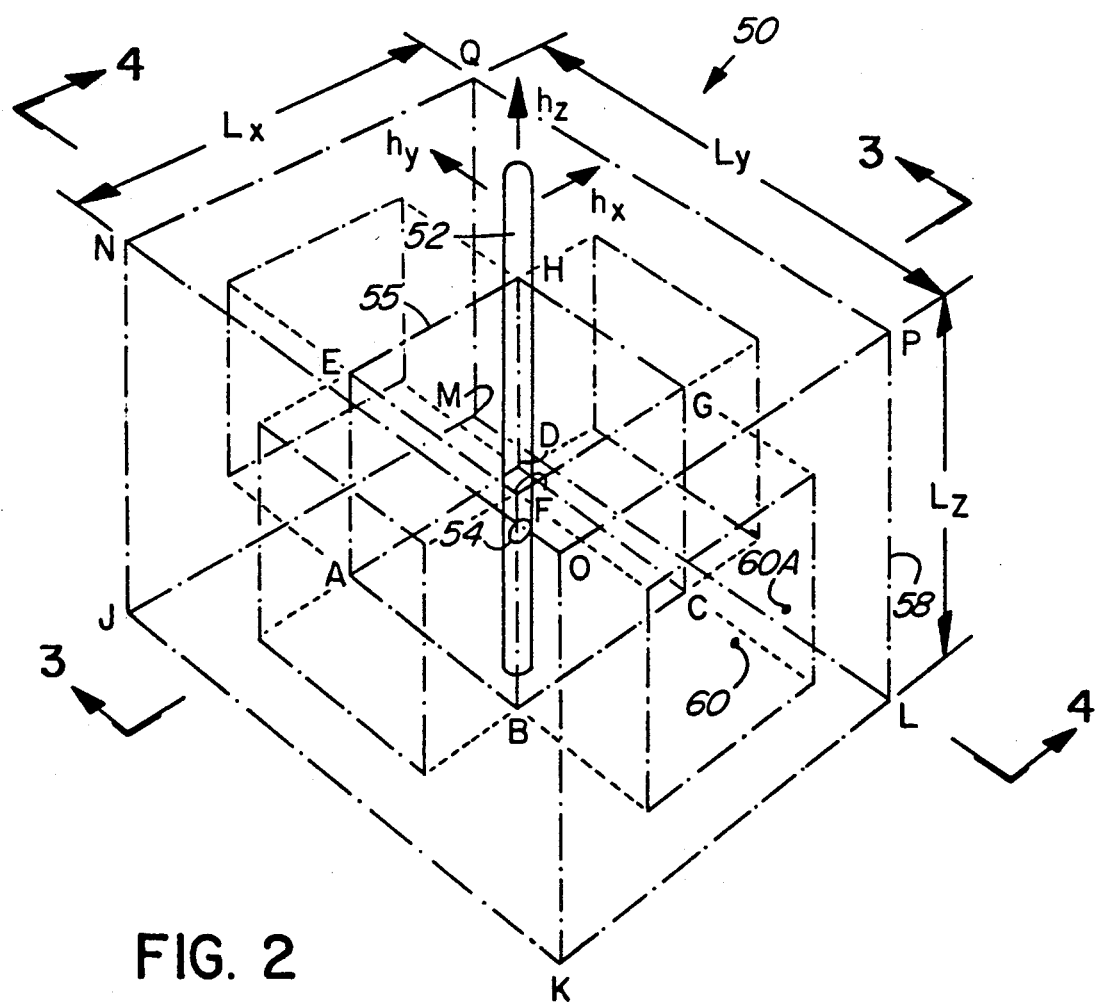
FIG. 2 is a schematic illustration of the mapping of a joystick to carry out the present invention.

Operation to move the end point 24 selectively in the x, y and z directions requires displacement of the manual controller such as the controller 50 indicated at FIG. 2 which comprises a joystick 52 that is moveable in the $h_x$, $h_y$ and $h_z$ directions to result in a corresponding movement of the control or reference point 54 of the joystick 52. The illustrated version is based on a particular joystick mounting, but may be applied to any suitable joystick device, e.g. one incorporating pivoting movements. In such a rotary type joystick it will be apparent that the cartesian coordinates of a reference point move along arcs as opposed to straight line movement.

The schematic illustration in FIG. 2 shows a particular mapping for movement of the joystick 52 to generate commands to operate the articulated arm. In the illustrated arrangement the joystick 52 is shown in its neutral position with its control point 54 centred in the mapped space.

Moving the point 54 anywhere within the box 55 defined by the letters A, B, C, D, E, F, G and H directs a computer sensor 56 to apply resolved motion commands to the arm so that movement of the end point 24 (see FIGS. 3 and 4) is correlated with movement of the joystick 52 (control point 54), i.e. movement of the joystick 52 in a given direction results in movement of the end point 24 in that same direction (corresponding direction) and at a speed dependent on the displacement of the joystick 52, provided the joystick 52 is only manipulated to move the sensor 54 within the box 55.

Movement of the end point 24 in the direction of movement of the control point 54 and at a speed governed by the amount of displacement of the control point 54 (joystick 52) from its datum or normal rest position is obtained by obeying the following equation:

$$V_x/h_x = V_y/h_y = V_z/h_z = K \tag{1}$$

where;

$V_x$, $V_y$ and $V_z$ = velocity of end point 24 in the x, y and z directions respectively.

$h_x$, $h_y$ and $h_z$ = amount of joystick displacement (control point 54 in the illustrated arrangement) in the x, y and z directions respectively.

K = a constant.

The value of the constant K is the gain of the control point 54 in the x, y and z directions and may be adjusted by adjusting the gain for example by a potentiometer schematically represented by the knob 57 (see FIGS. 3 and 4). The gain defines the ratio of change in end point velocity to change in the corresponding component of movement of the manual controller or joystick.

The slope of straight line portion of curve 100 (to point 102) of FIG. 5 is equivalent to K and represents the correspondence between the joystick 52 displacement and end point 24 velocity in each of the respective x, y and z directions, i.e. for an equal component of displacement in the x, y or z directions the velocity of the end point 24 in the corresponding x, y and z direction is the same for each of these directions. This holds true provided the control point 54 is located within the box 55.

In the schematic illustration of the box 55 the box has been shown in the form of a cube but may be a selected rectangular solid or right angular parallelepiped should the one of the $V_{(x, y \, or \, z)}/h_{(x, y \, or \, z)}$ relationships of equation (1) be set to apply for one component over a different range of movement of the control point 54 than the others.

Also it will be apparent that the corners of the rectangular solid 55 may be rounded depending on the capabilities of the hydraulic system in moving the arm segments, for example when a corner of the rectangular solid is approached the system is demanding maximum velocity in at least 2 and possible 3 directions and the hydraulic system may simply be incapable of delivering the required fluid flows to obtain the corresponding movement of the end point 24 which will require shaping of the box 55 with rounded corners (for example, as in a cuboid).

The point 54 may be moved outside of the box 55 and into the surrounding box 58, the corners of which are designated by the letters J, K, L, M, N, P and Q. When the control point 54 is moved out of the box 55 the relationship of equation (1) need not be maintained so that the movement of the end point 24 does not as accurately follow the direction of movement of the joystick 52 and the velocity may take on a different value in each of the x, y and z directions. For example, $$dV_x/dh_x = K_{x(h)}; \; dV_y/dh_y = K_{y(h)}; \text{ and}$$
$$dV_z/dh_z = K_{z(h)}$$

and $K_{x(h)}$, $K_{y(h)}$ and $K_{z(h)}$ need not be equal, in fact are likely to be different, and may be smaller or more likely at least one and probably all will be larger than K. Furthermore, if desired one or more of these gains need not be constant over a long range of movement of the joystick, i.e. these constants may change with further movement of the joystick away from the datum or neutral position. For example, assume the joystick 52 were moved to position the point 54 outside of the box 55, i.e. move the stick straight in the $h_y$ direction to the position indicated at 60 (see particularly FIG. 4), the point 54 is outside of the box 55 and within the box 58 but remains within the projections of the top and bottom wall of the box 55 and within the projection of the two side walls parallel to the $h_y$ direction, i.e. defining the boundaries of the $h_z$ and $h_x$ directions of displacement in the box 55. It is preferred that the gain in the y direction now be changed independently of the gains in the x and z directions, i.e. $V_y/h_y > V_x/h_x$ or $V_z/h_z$ and may continue to change as the joystick displacement is changed.

It will be apparent that any movement outside of the box 55 in any direction may result in a change in velocity for an incremental movement of the joystick 52 that is different than the change in velocity for movement of the point 54 within the box 55.

If the control point 54 is moved outside of the box 55 in one or more of the directions x, y or z then the gain in the x, y or z directions for a displacement of the joystick 52 in the corresponding direction may not be the same. For example, the slope of the curve $Y_E$ indicated at a point $y_e$ would represent $K_{y(e)}$ at this position of the joystick and in the illustration of FIG. 5 has a slope greater than the curve $X_E$ at the point $x_e$ (slope $K_{x(e)}$ at this position of the joystick) which in turn has a slope greater than the slope of the curve $Z_E$ at point $z_e$ (slope $K_{z(e)}$) indicating that if the point 54 is moved out of the box 55 in the y direction the incremental increase in speed of the end point 24 in the y direction for a given incremental displacement of the joystick 52 in the y direction will be higher than the change in speed of the end point 24 in the x or z directions for a corresponding increment of movement of joystick in the x or the z directions as depicted by the curves $X_E$ and $Z_E$.

The values for $K_{x(e)}$, $K_{y(e)}$ or $K_{z(e)}$ may be based on the differences between amount of displacement of the joystick available between the periphery of the box 55 and the periphery of the box 58 in each of the respective x, y and z directions and the difference between the maximum velocity attainable by the equipment in the x, y or z directions and the maximum velocity attainable in these respective directions when the control point 54 is within the box 55.

It will be noted that the size of the box 58 in the y direction as indicated by the dimension $L_y$ may be longer than the box 58 in the x direction as indicated by the direction $L_x$ which in turn may be greater than the dimensions $L_z$ so that the box 58 may have substantially rectangular sides, ends, bottom and top. In the illustrated arrangement the rest or datum position of the reference point 54 has been shown centred in the box 55 (and 58) but this not a necessity.

The corners of the box 58 may be rounded as described above in relation to the box 55 for the same reasons given above for the box 55 to have rounded corners.

It will be apparent that with the mapping system described above, the operator may now operate the equipment at its maximum allowable speed based on the physical limitations on the equipment in any given direction that is selected by moving the control point 54 beyond the box 55, but that when accurate movement and positioning of the end point 24 is desired the joystick 52 is simply positioned with the control point 54 within the box 55 and precise directional correspondence between joystick displacement and end point velocity can be obtained within the preselected area of the workspace.

The endpoint may also be moved from the defined workspace into the surrounding space wherein the above conditions do not apply. For example the endpoint may be moved out of the workspace toward the full extension in say the x direction and as it traverses the boundary of the defined workspace the position of the manual controller cannot apply the same limitations on the speed of the endpoint because one or more of the joints may be required, to rapidly increase in speed as the endpoint attempts to meet the x direction speed requirements i.e. joint speed may attempt to change at an undesirable rate. Similarly when operating outside of the defined workspace, for example, with the endpoint 24 adjacent to the z axis the angular velocity around the z axis required to obtain the desired velocity of the endpoint 24 in the y direction may be too high. It has been found that limiting the maximum rate of change of one or more of the joints of the arm provides a suitable remedy that ensures that the arm motion is acceptably smooth when operated outside the workspace, particularly when crossing the workspace border. As defined above outside of the workspace the capability of the arm to move the end point is limited, yet the manual controller is signalling for a change that is beyond the capability of one or more of the joints of the arm or requires an unacceptable rate of change in one or more of the joints. These problems are substantially overcome by setting realistic limits on the maximum rate of change of each of the joints.

The gain for the joystick may be set in a variety of different ways, however the preferred system was set up in the following manner.

1. Determine the maximum speed of the end point 24 achievable in at least one point in each of the x, y and z directions within the predefined work space. Select the smallest of the 3 speeds, for example, assume that the smallest maximum obtainable was in the x direction and was 2 meters per second.
2. The maximum physical displacement of the joystick in the x direction, i.e. the direction having the smallest maximum obtainable speed was set to represent that maximum speed, i.e. for this example 2 meters per second for the end point in the x direction at maximum displacement of the hand controller 52 in the x direction, i.e. at $h_x$=maximum.
3. Determine the smallest maximum speed in any direction that can be obtained throughout the full extent of the preselected workspace in any one of the x, y and z directions, for this example, assume a maximum endpoint speed of 1 meter per second in the x direction may be obtained anywhere within the preselected workspace and this maximum is the lowest of the three. One may also select a speed slower than the smallest maximum if desired.
4. Now a preselected hand controller displacement in the x direction is selected. This particular selection may be changed, for example, which will change the gain and will form a different selected percentage of the full scale displacement of the hand controller, i.e. it will be some percentage of $h_{x\ max}$, for example 60%, so that the inner box 55 will have a width of $2 \times 0.6 \times h_x$ max.
5. The smallest maximum linear speed described above in 3, i.e. this particular example x=1 meter per second, occurs at the preselected maximum hand controller displacement at the x margin of the inner box 55. This of course sets the gain for the inner box which in the particular example is $K_x$ required to obtain the speed of 1 meter per second at the x boundary of the inner box 55.
6. The relationship between the outer periphery of the box 55 and the periphery of the box 58 in the x direction is now set to obtain a maximum velocity of 2 meters per second over the remaining movement of the hand controller, i.e. from the 60% displacement to the 100% displacement in the x direction.
7. A similar procedure is then followed for each of the other of the x, y and z directions (in this example the y and z directions) correlating the gain to the joystick displacement with the gain inside the box 55 in each of the x, y and z directions the same, i.e. as above described at $K_x = K_y = K_z$.
8. The lengths of the box 55 in each of the remaining directions are also preselected, i.e. the inner box 55 may be cuboid shape or a substantially right parallelepiped. It will be apparent that the length of the box 55 in the y and z directions may be selected as desired, for example in the y direction only 40% of $h_{ymax}$ may be used as part of the box 55 i.e. width of the box in the y direction may be set at $2 \times 0.40 \times h_{ymax}$.

If the inner box 55 is set as a cuboid it will be apparent that the maximum speed when the joystick is within the box 55 in any direction will be equal even though in some direction the maximum speed achievable throughout the whole of the workspace may be higher which would permit the formation of a rectangular parallelepiped shaped inner box 55, if so desired.

It is important to select the dimensions of the inner box relative to the outer box to establish a percentage of total displacement in each of the directions, (i.e. percentage of the distance to the outer periphery of the outer box 58 that the inner box 55 will occupy and this will normally be set to the operator's preference) so that the operator is most comfortable in using the equipment. Reducing the size of the inner box, i.e. accepting a lower than achievable maximum speed in any one direction does not pose a problem and permits the spacing or the movement available between the box 55 and the box 58 to be increased so that the joystick movement available to bring the speed of the end point in that particular direction up to its maximum (step 1) from the maximum obtainable within the box (step 3) may be made longer.

It will also be apparent that once the maximum speed to be obtained while operating within the box 55 has been determined, size of the box 55 may also be changed by changing the gain so that the percentage of the box 58 occupied by the box 55 will be changed depending on the preselected gain which determines the required movement to reach the selected maximum speed in box 55 as provided for in step 3 above.

It is also possible to ensure that the transition between the box 55 and box 58, i.e. as the joystick is moved out of the box 55 and into the box 58 that there is no sudden change in gain as illustrated in FIG. 5A the curve 100 and curve $y_e$ are interconnected by a smooth curve in the area 102 that approaches the curve 100 at a tangent and the curve $Y_E$ at a tangent and have minimum radius to prevent jumping of the end point as the transition is made from the box 55 to the box 58.

In order to set the percentage of the total movement of the joystick in the x, y or z direction, suitable control knobs indicated at 59 may be used which will define the boundaries of the inner box 55, however any setting must obey the above described rules so that the movement of the joystick in any direction within the box 55 will never result in exceeding the preselected achievable maximum velocity as described in paragraph 3 above, i.e. the controls 59 cannot be used to override the basic parameters necessary to obtain controlled movement anywhere within the box 55.

Figure 6:
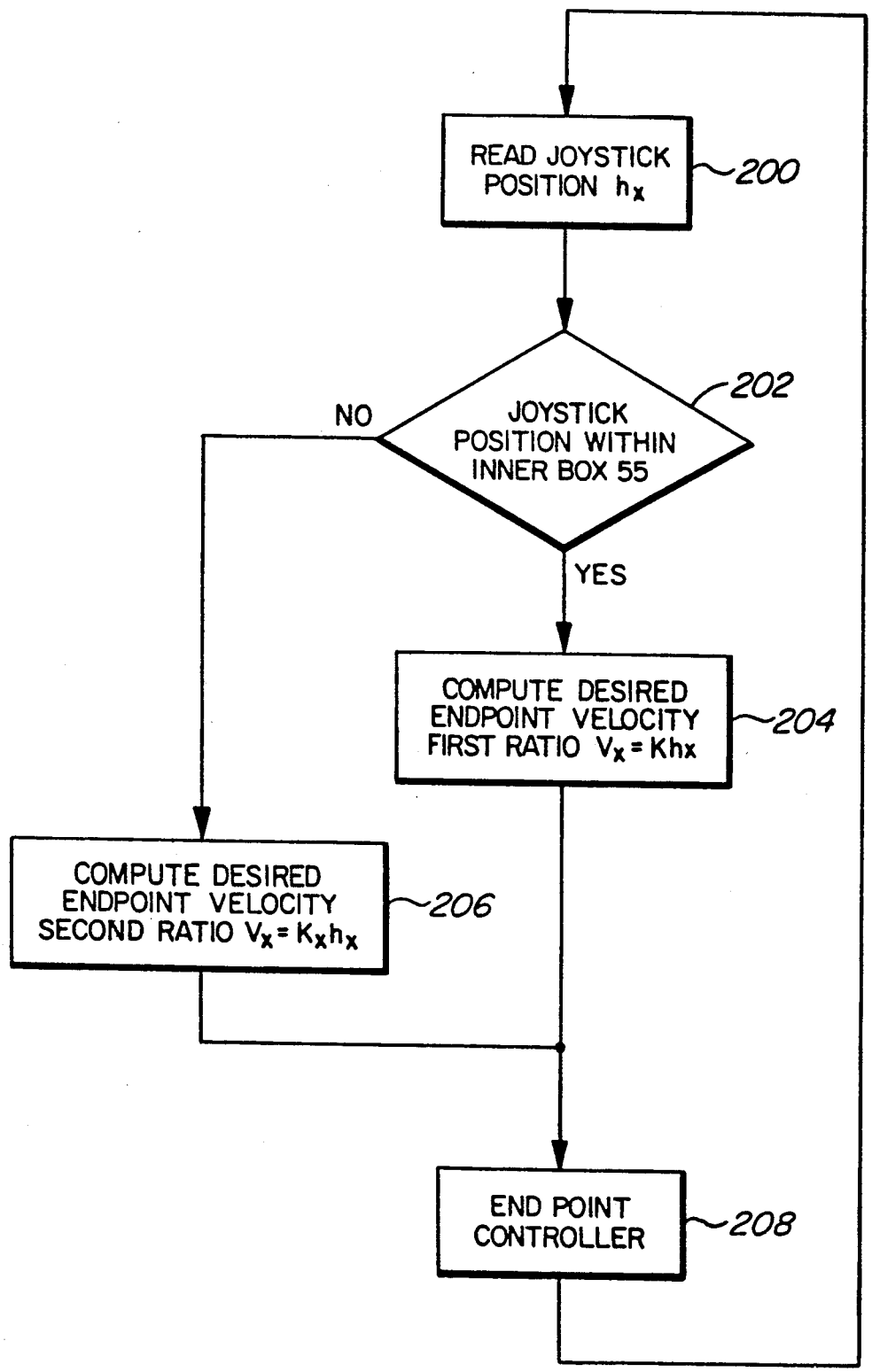
FIG. 6 is a flow diagram schematically illustrating the joystick control.

The above described control strategy is schematically presented in FIG. 6. As is apparent it is first necessary to read the joystick position as indicated at 200 and to determine, as clearly described above, whether the joystick has been displaced within or beyond the inner box 55 as indicated at 202. (Obviously similar determination are simultaneously being made in each of the x, y and z directions of joystick displacement).

If the answer to the query of 202 is "Yes" the next step is to calculate the desired end point velocity as described above using the first ratio as indicated at 204. On the other hand if the answer to the query 202 is "No" the next step is to again compute the desired end point velocity but this time using the second ratio as indicated at 206. When the desired end point velocity is determined either by the route 204 or 206 the conventional end point control 208 is actuated accordingly.

Having described the invention, modifications will be evident to those skilled in the art without department from the spirit of the invention as defined in the appended claims.

We claim:

1. A method for controlling the movement of an end point of an articulated arm in x, y and z directions using a resolved motion control means having a manual controller by imposing a predetermined first ratio of desired end point velocity component in the x, y and z direction to manual controller displacement component in the corresponding x, y or z direction to all said components of desired endpoint velocity provided total movement of said controller in said x, y and z directions does not exceed a preselected displacement in any one of said x, y and z directions so that said end point moves in a direction corresponding to the direction of movement of said manual controller and when said end point is within a preselected work space; changing said ratio of desired end point velocity to manual controller displacement in at least one of said x, y or z directions for a given component of displacement of said controller when said manual controller is moved beyond said preselected displacement of said manual controller in said at least one direction to a second ratio of desired end point velocity to manual controller displacement higher than said first ratio.

2. A method as defined in claim 1 wherein said at least one direction is said y direction.

3. A method as defined in claim 1 wherein said second ratio is a variable ratio that changes with increased displacement of said manual controller beyond said preselected displacement.

4. A method as defined in claim 1 wherein said first ratio is represented by the equations $$V_x/h_x = V_y/h_y = V_z/h_z = K \quad (1)$$

where;

$V_x$, $V_y$ and $V_z$ = velocity of end point 24 in the x, y and z directions respectively.

$h_x$, $h_y$ and $h_z$ = amount of manual controller displacement (control point 54 in the illustrated arrangement) in the x, y and z directions respectively;

K = a constant.

5. A method as defined in claim 3 wherein said second ratio for said x, y and z directions are represented by the equations $$dV_x/dh_x = K_{x(h)}; \ dV_y/dh_y = K_{y(h)}; \ \text{and}$$
$$dV_z/dh_z = K_{z(h)}$$

and wherein $K_{x(h)}$, $K_{y(h)}$ and $K_{z(h)}$ may be different.

6. A method as defined in claim 5 wherein at least one of said $K_{x(h)}$, $K_{y(h)}$ and $K_{z(h)}$ is larger than K.

7. A method as defined in claim 6 wherein each of said $K_{x(h)}$, $K_{y(h)}$ and $K_{z(h)}$ is larger than K.

8. A method as defined in claim 5 wherein $K_{x(h)}$, $K_{y(h)}$ and $K_{z(y)}$ are different constants.

9. A control system for controlling the movement of an end point of an articulated arm in x, y and z directions comprising a resolved motion control means including a manual controller, said control means imposing a predetermined first ratio of desired end point velocity component in the x, y and z direction to manual controller displacement component in the corresponding x, y or z direction to all said components of desired endpoint velocity provided total movement of said controller in said x, y and z directions does not exceed a preselected displacement in any one of said x, y and z directions so that said end point moves in a direction corresponding to the direction of movement of said manual controller when said end point is within a preselected work space, said control means changing said ratio of desired end point velocity to manual controller displacement in at least one of said x, y or z directions for a given component of displacement of said controller when said manual controller is moved beyond said preselected displacement of said manual controller in said at least one direction to a second ratio of desired end point velocity to manual controller displacement higher than said first ratio.

10. A control system as defined in claim 9 wherein said at least one direction is said y direction.

11. A control system as defined in claim 9 wherein said second ratio is a variable ratio that changes with increased displacement of said manual controller beyond said preselected displacement.

12. A control system as defined in claim 9 wherein said first ratio is represented by the equations $$V_x/h_x = V_y/h_y = V_z/h_z = K \quad (1)$$

where;

$V_x$, $V_y$ and $V_z$ = velocity of end point 24 in the x, y and z directions respectively.

$h_x$, $h_y$ and $h_z$ = amount of manual controller displacement (control point 54 in the illustrated arrangement) in the x, y and z directions respectively.

K = a constant.

13. A control system as defined in claim 12 wherein said second ratio for said x, y and z directions are represented by the equations $$dV_x/dh_x = K_{x(h)}; \ dV_y/dh_y = K_{y(h)}; \ \text{and}$$
$$dV_z/dh_z = K_{z(h)}$$

and wherein $K_{x(h)}$, $K_{y(h)}$ and $K_{z(h)}$ may be different.

14. A control system as defined in claim 13 wherein at least one of said $K_{x(h)}$, $K_{y(h)}$ and $K_{z(h)}$ is larger than K.

15. A control system as defined in claim 13 wherein each of said $K_{x(h)}$, $K_{y(h)}$ and $K_{z(h)}$ is larger than K.

16. A control system as defined in claim 13 wherein $K_{x(h)}$, $K_{y(h)}$ and $K_{z(h)}$ are different constants.

* * * * *